(12) United States Patent
Jang et al.

(10) Patent No.: US 11,506,447 B2
(45) Date of Patent: Nov. 22, 2022

(54) REFRIGERATOR WITH LIGHT GUIDE MEMBER

(71) Applicant: Samsung Electronics Co., Ltd., Suwon-si (KR)

(72) Inventors: Myoungjin Jang, Suwon-si (KR); Jiyong Park, Suwon-si (KR); Jinhong Yu, Suwon-si (KR); Seungjae Lee, Suwon-si (KR); Jisick Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/301,962

(22) Filed: Apr. 20, 2021

(65) Prior Publication Data

US 2021/0333045 A1     Oct. 28, 2021

(30) Foreign Application Priority Data

Apr. 22, 2020  (KR) ................... 10-2020-0048590

(51) Int. Cl.
*F25D 27/00*     (2006.01)
*F25D 25/02*     (2006.01)
(Continued)

(52) U.S. Cl.
CPC .......... *F25D 27/00* (2013.01); *F21V 33/0044* (2013.01); *F25D 25/025* (2013.01);
(Continued)

(58) Field of Classification Search
CPC ............ G02B 6/0095; F21W 2131/305; F25D 25/025; F25D 27/00
See application file for complete search history.

(56) References Cited

U.S. PATENT DOCUMENTS 5,582,479 A      12/1996  Thomas et al.
9,377,578 B2 *    6/2016  Gooden ................. F25D 25/02
(Continued)

FOREIGN PATENT DOCUMENTS

CN       204902389 U    12/2015
EP         2433072 B1    9/2014
(Continued)

OTHER PUBLICATIONS

Ogawa, Storage device and refrigerator, 2007, JP2007032861A, English Language Translation by Espacenet, https://worldwide.espacenet.com/patent/search/family/037792340/publication/JP2007032861A?q=pn%3DJP2007032861A (Year: 2007).*

(Continued)

*Primary Examiner* — Elmito Breval
*Assistant Examiner* — Michael Chiang

(57) ABSTRACT

A refrigerator including a storage chamber. The refrigerator also includes a first sidewall and a second sidewall arranged to form at least a portion of both side surfaces of the storage chamber. The refrigerator further includes a light source arranged on the first sidewall to illuminate an inside of the storage chamber. The refrigerator also includes a light guide member provided inside the storage chamber and formed to extend between the first sidewall and the second sidewall to guide light emitted from the light source. The light guide member includes an incident surface arranged to face the first sidewall and an exit surface through which the light guided by the light guide member is emitted to an outside of the light guide member.

18 Claims, 19 Drawing Sheets

(51) Int. Cl.
*F21V 33/00* (2006.01)
*F21V 8/00* (2006.01)
*F21Y 115/10* (2016.01)
*F21W 131/305* (2006.01)

(52) U.S. Cl.
CPC ..... *G02B 6/0095* (2013.01); *F21W 2131/305* (2013.01); *F21Y 2115/10* (2016.08); *G02B 6/0036* (2013.01)

(56) References Cited

U.S. PATENT DOCUMENTS

| | | | |
|---|---|---|---|
| 9,920,920 B2 | 3/2018 | Signorino et al. | |
| 10,222,055 B2* | 3/2019 | Pan | F21V 23/04 |
| 10,634,420 B2* | 4/2020 | Wantland | F25D 27/00 |
| 10,935,308 B2 | 3/2021 | Fei et al. | |
| 2004/0264160 A1* | 12/2004 | Bienick | G02B 6/0086 362/602 |
| 2009/0021927 A1* | 1/2009 | Hall | G02B 6/0038 362/92 |
| 2012/0043338 A1* | 2/2012 | Yang | F25D 25/02 220/592.02 |
| 2012/0106129 A1* | 5/2012 | Glovatsky | F25D 23/067 362/92 |
| 2012/0127756 A1* | 5/2012 | Kim | G02B 6/009 362/612 |
| 2014/0265808 A1* | 9/2014 | Kendall | A47B 88/47 312/408 |
| 2016/0187055 A1* | 6/2016 | Alt | F25D 25/02 362/92 |
| 2018/0017317 A1* | 1/2018 | Adachi | F21V 33/0044 |

FOREIGN PATENT DOCUMENTS

| | | | | |
|---|---|---|---|---|
| JP | 2002307994 A | * | 10/2002 | B60N 3/102 |
| JP | 2006-073384 A | | 3/2006 | |
| JP | 2007032861 A | * | 2/2007 | F25D 27/00 |
| JP | 2007032861 A | | 2/2007 | |
| JP | 2019100660 A | | 6/2019 | |
| KR | 10-0215042 B1 | | 8/1999 | |
| KR | 10-0428903 B1 | | 8/2004 | |
| KR | 10-0774518 B1 | | 11/2007 | |
| KR | 10-0793784 B1 | | 1/2008 | |
| KR | 20090074966 A | | 7/2009 | |
| KR | 10-0976981 B1 | | 8/2010 | |
| KR | 10-1028749 B1 | | 4/2011 | |
| KR | 10-1052472 B1 | | 7/2011 | |
| KR | 10-1208287 B1 | | 12/2012 | |
| KR | 10-1286902 B1 | | 7/2013 | |
| KR | 10-1639449 B1 | | 7/2016 | |
| KR | 101639449 B1 | * | 7/2016 | F25D 27/00 |
| KR | 10-1802519 B1 | | 11/2017 | |

OTHER PUBLICATIONS

Suzuki, Container holder, 2002, JP2002307994A, English language translation by Google Patents, https://patents.google.com/patent/JP2002307994A/en (Year: 2002).*

International Search Report and Written Opinion of the International Searching Authority in connection with International Application No. PCT/KR2021/004918 dated Aug. 13, 2021, 7 pages.

* cited by examiner

REFRIGERATOR WITH LIGHT GUIDE MEMBER

CROSS-REFERENCE TO RELATED APPLICATION

This application is based on and claims priority under 35 U.S.C. § 119 to Korean Patent Application No. 10-2020-0048590, filed on Apr. 22, 2020 in the Korean Intellectual Property Office, the disclosures of which are incorporated herein by reference.

BACKGROUND

1. Field

The disclosure relates to a refrigerator, and more specifically, to a refrigerator having an improved lighting structure.

2. Description of Related Art

A refrigerator is a home appliance that includes a main body, a door, a storage chamber formed between the main body and the door to store food, and a cold air supply system for supplying cold air to the storage chamber. The storage chamber includes a refrigerating chamber to keep food refrigerated at a temperature between about 0° C. and +5° C. and a freezing chamber to keep food frozen at a temperature between about −35° C. and 0° C.

The freezing chamber and the refrigerating chamber of the refrigerator may accommodate foods of various sizes, and the refrigerator generally includes a plurality of shelves that divide the storage chamber of the refrigerator in an upper and lower side direction to increase the space utilization.

Since the storage chamber of the refrigerator is dark, lighting may be provided in the inner space for the user to easily find the stored food.

The lighting of the refrigerator is provided to be turned on when the user opens the refrigerator door or the refrigerating chamber door so that the user checks the food stored in the storage chamber.

In this case, the lighting generates light through a light source located at the upper end of a storage shelf while illuminating the shelf, and as the light is directly emitted to the user, the user may be given glare and feel discomfort.

SUMMARY

Therefore, it is an object of the disclosure to provide a refrigerator having an improved lighting structure.

Therefore, it is another object of the disclosure to provide a refrigerator having an indirect lighting function in which light of a light source is transmitted through a side surface of a shelf.

Therefore, it is another object of the disclosure to provide a refrigerator having an indirect lighting structure in which light generated from a side surface of a cabinet is incident on a side surface of a shelf to be evenly emitted over the entire surface of the shelf.

Therefore, it is another object of the disclosure to provide a refrigerator having an indirect lighting structure provided to allow light generated from a side surface of a cabinet to be incident through a side surface of a drawer to be evenly emitted through a front surface of the drawer.

Therefore, it is another object of the disclosure to provide a refrigerator formed to have a degree of freedom of position and shape by arranging a light source on a non-visible surface of a side surface of a shelf.

Additional aspects of the disclosure will be set forth in part in the description which follows and, in part, will be obvious from the description, or may be learned by practice of the disclosure.

According to an aspect of the disclosure, there is provided a refrigerator including: a storage chamber; a first sidewall and a second sidewall arranged to form at least a portion of both side surfaces of the storage chamber; a light source arranged on the first sidewall to illuminate an inside of the storage chamber; and a light guide member provided inside the storage chamber and formed to extend between the first sidewall and the second sidewall to guide light emitted from the light source, wherein the light guide member includes an incident surface arranged to face the first sidewall and an exit surface through which the light guided by the light guide member is emitted to an outside of the light guide member.

The exit surface may include a light guide pattern.

The refrigerator may further include a reflective member provided to reflect the light guided by the light guide member.

The light source may include a plurality of light emitting diodes (LEDs) arranged in a front and rear side direction of the storage chamber, the light guide member may further include a shelf frame forming an edge, and the shelf frame may be formed in at least a portion thereof with openings to correspond to the plurality of LEDs.

The shelf frame may further include a guide rib that guides the opening to be adjacent to the light source.

The first sidewall and the second sidewall may be formed with a light source installation hole in which the light source is installed.

The refrigerator may further include a lighting cover provided on the light source installation hole to cover the light source and including a material that transmits light of the light source.

The light guide pattern may include one shape of a circle, an ellipse, a quadrangle, a polygon, a diamond or an embossing.

The light guide pattern may have different densities between a first region that is a center of the light guide member and a second region except for the first region.

The density of the light guide pattern may decrease from the center of the light guide member toward an end portion of the light guide member.

The refrigerator may further include: a drawer provided to be inserted into or withdrawn from the storage chamber; and a drawer case provided to accommodate the drawer, wherein the light guide member may be arranged on a front surface of the drawer case.

The drawer may further include a front panel, and the light guide member may be provided on the front panel.

The light guide member may include one of a panel, a bar or a band.

According to another aspect of the disclosure, there is provided a refrigerator including: a storage chamber; a first sidewall and a second sidewall arranged to form at least a portion of both side surfaces of the storage chamber; a first light source arranged on the first sidewall to illuminate an inside of the storage chamber; a second light source arranged on the second sidewall to illuminate an inside of the storage chamber; and a light guide member formed to extend between the first sidewall and the second sidewall to guide light emitted from the first light source and the second light source, wherein the light guide member includes a first incident surface arranged to face the first sidewall, a second incident surface arranged to face the second sidewall, and an exit surface through which the light guided by the light guide member is emitted to an outside of the light guide member.

The refrigerator may further include a reflective member provided to reflect the light guided by the light guide member.

The refrigerator may include a light guide pattern formed on the exit surface, and the light guide pattern may include one of a circle, an ellipse, a quadrangle, a polygon, a diamond, or an embossing.

The light guide pattern may have a density that decreases from a center of the light guide member toward both end portions of the light guide member.

The first sidewall and the second sidewall may be formed with a light source installation hole in which the light source is installed, and the refrigerator may further include a lighting cover provided on the light source installation hole to cover the light source.

The refrigerator may further include: a drawer provided to be inserted into or withdrawn from the storage chamber; and a drawer case provided to accommodate the drawer, wherein the light guide member is arranged on a front surface of the drawer case.

According to another aspect of the disclosure, there is provided a refrigerator including: a storage chamber; a first sidewall and a second sidewall arranged to form at least a portion of both side surfaces of the storage chamber; a light source arranged on the first sidewall to illuminate an inside of the storage chamber; and a shelf including a light guide member provided inside the storage chamber and formed to extend between the first sidewall and the second sidewall to guide light emitted from the light source, wherein the shelf includes: an incident surface arranged to face the first sidewall; and an exit surface having a light guide pattern formed to allow the light guided by the light guide member through the incident surface to be emitted to an outside of the light guide member.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
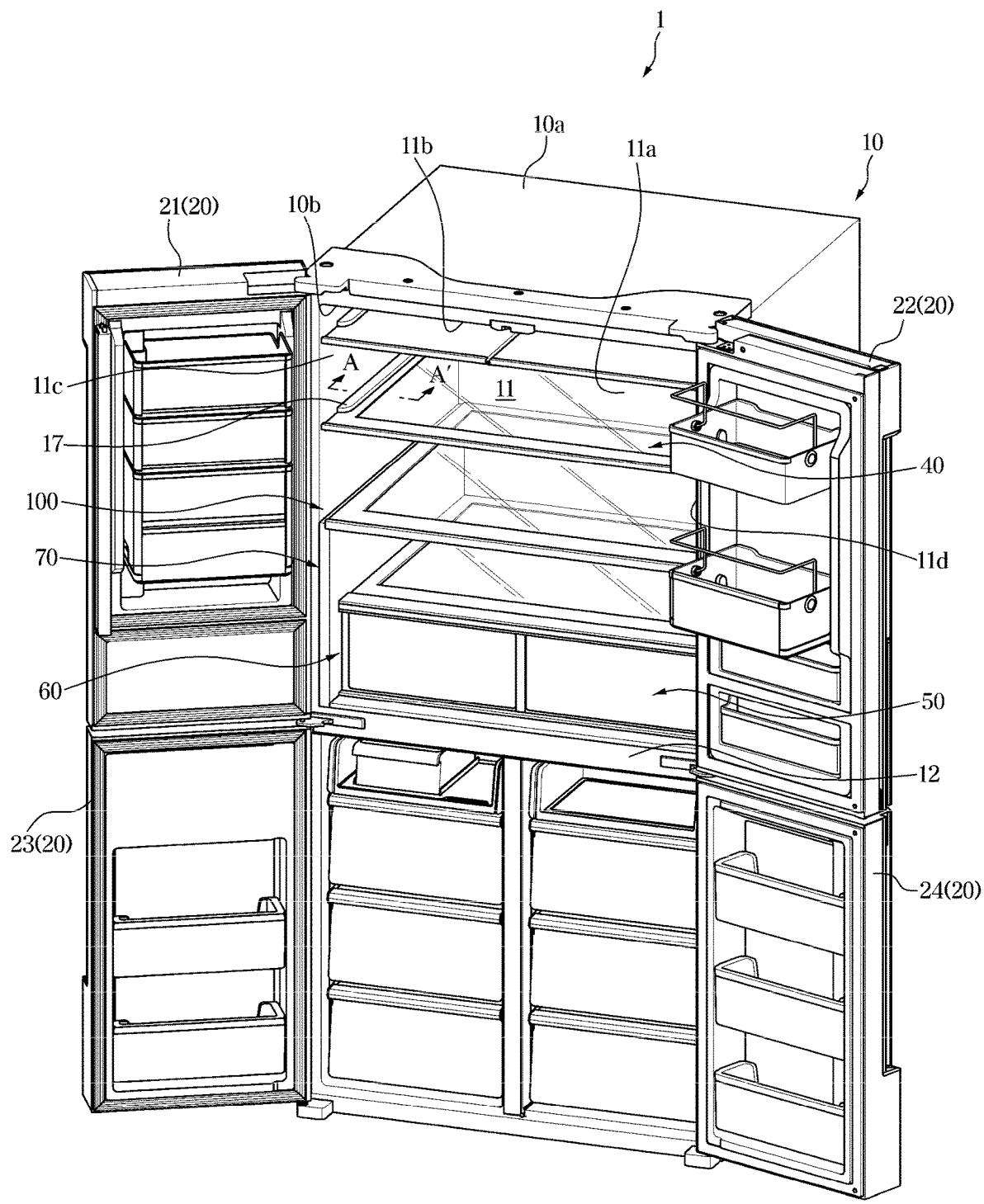
FIG. 1 illustrates a refrigerator according to an embodiment of the disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments set forth herein and illustrated in the configuration of the disclosure are not representative of the full technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

Hereinafter, embodiments according to the disclosure will be described in detail with reference to the accompanying drawings.

In the following description, the terms "a front surface" and "a front side " refer to a front surface and a front side viewed from the front of a refrigerator 1 illustrated in FIG. 1, and the term "a rear side" refers to a side directed to rearward of the refrigerator 1.

Figure 2:
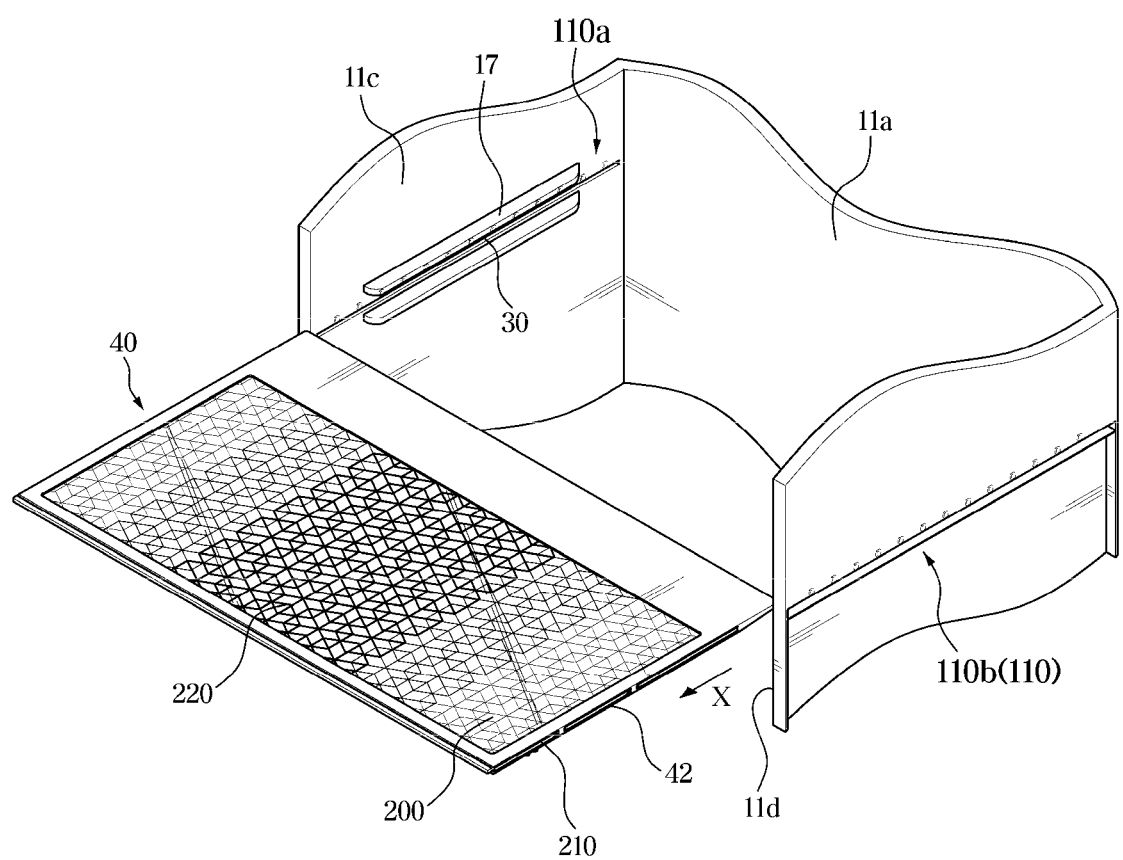
FIG. 2 illustrates a perspective view of a shelf mounted in a refrigerator according to an embodiment of the disclosure.

FIG. 1 illustrates a refrigerator according to an embodiment of the disclosure, and FIG. 2 illustrates a perspective view of a shelf mounted in a refrigerator according to an embodiment of the disclosure.

Referring to FIGS. 1 to 2, a refrigerator 1 includes a cabinet 10 forming a storage chamber 11 and a door 20 installed in the cabinet 10 to open and close the storage chamber 11.

The cabinet 10 may be formed in a box shape with an open front, and the storage chamber 11 may be formed in the cabinet 10. The storage chamber 11 may be divided by a partition wall 12. The partition wall 12 divides the storage chamber 11 horizontally, so that an upper side of the storage chamber 11 may be used as a refrigerating chamber, and a lower side of the storage chamber may be used as a freezing compartment.

In general, the lower side storage chamber is maintained at a temperature below zero, and the upper side storage chamber is maintained at a relatively higher temperature than the lower side storage chamber, to store food.

The refrigerator 1 may include a cold air supply device (not shown) that supplies cold air to the storage chamber 11. The cold air supply device includes a compressor, a condenser, an expansion valve, an evaporator, and a blower fan, and may generate cold air through a cooling cycle and supply the generated cold air to the storage chamber.

The refrigerator according the embodiment represents a Bottom Mounted Freezer Type (BMF) type refrigerator having four doors, but the scope of the disclosure is not limited thereto, and the disclosure may be applied to various types of refrigerators, such as a top mounted freezer type (TMF) type refrigerator, a side-by-side type refrigerator, a French door type refrigerator, a one-door refrigerator, and the like.

The door 20 may be provided in an opening of the cabinet 10 to open and close the storage chamber 11. The door 20 may include refrigerating chamber doors 21 and 22 installed to open and close the upper side storage chamber 11 and freezing chamber doors 23 and 24 installed to open and close the lower side storage chamber.

The refrigerating chamber doors 21 and 22 and the freezing chamber doors 23 and 24 may be provided to open and close the open front of the storage chamber 11 by rotation, and each may be provided as a pair at left and right sides.

The cabinet 10 includes an outer case 10a forming the external appearance thereof, and an inner case 10b forming the storage chamber 11, in which food is stored, that is, the storage chamber 11. A predetermined space is formed between the outer case 10a and the inner case 10b. A foaming solution is filled between the outer case 10a and the inner case 10b, and the filled foaming solution solidifies to form an insulating layer (not shown).

The inner case 10b of the storage chamber 11 may include a rear wall 11a forming the rear surface, an upper wall 11b forming the upper surface of the storage chamber 11, and a first sidewall 11c and a second sidewall 11d connected to the rear wall 11a and the upper wall 11b to form both side surfaces of the storage chamber 11.

The storage chamber 11 may be provided with a plurality of shelves 40 or drawers 50 provided to store food.

The plurality of shelves 40 are provided to store food and the like in the storage chamber 11. The plurality of shelves 40 may be separably provided in the storage chamber 11. The plurality of shelves 40 may be provided to be inserted into or withdrawn from the storage chamber 11 in a front and rear side direction. The plurality of shelves 40 are provided to be slidable from the storage chamber 11 in the front and rear side direction.

A support rib 17 may be provided on the inner case 10b of the storage chamber 11 to support the plurality of shelves 40 on the storage chamber 11. The support ribs 17 may be provided on the first sidewall 11c and the second sidewall 11d. The support rib 17 may be provided to seat the shelf 40 thereon. The support ribs 17 may be provided to support upper and lower portions of both sides of the shelf 40. The support ribs 17 may be arranged in the storage chamber 11 at predetermined intervals. In the embodiment of the disclosure, the support rib is illustrated as being separately installed on the inner surface of the storage chamber. However, the disclosure is not limited to, and the support rib on which the shelf is installed may be integrally formed with the inner surface of the storage chamber.

The drawer 50 for storing food may be installed in the storage chamber 11 to be inserted into and withdrawn from the storage chamber 11. The drawer 50 may be provided to be inserted into or withdrawn from the storage chamber 11. The drawer 50 may be provided to be movable in a front and rear side direction X of the storage chamber 11. In the embodiment of the disclosure, two drawers are illustrated as an example, but the scope of the disclosure is not limited thereto. For example, the number of drawers may be changed according to the capacity of the storage chamber.

The storage chamber 11 of the refrigerator 1 may be provided with a lighting structure 100 provided to illuminate the inside of the storage chamber 11 so that the user may easily check the food.

Figure 3:
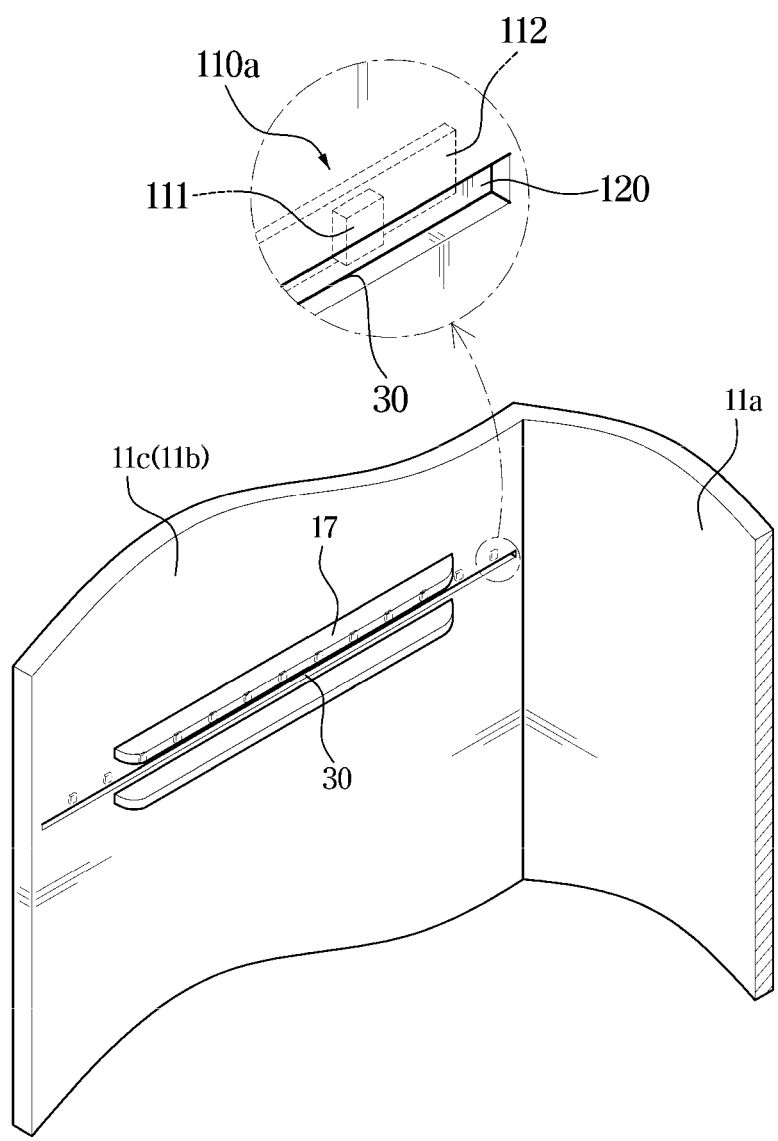
FIG. 3 illustrates a light source mounted on an inner case of a refrigerator according to an embodiment of the disclosure.
Figure 4:
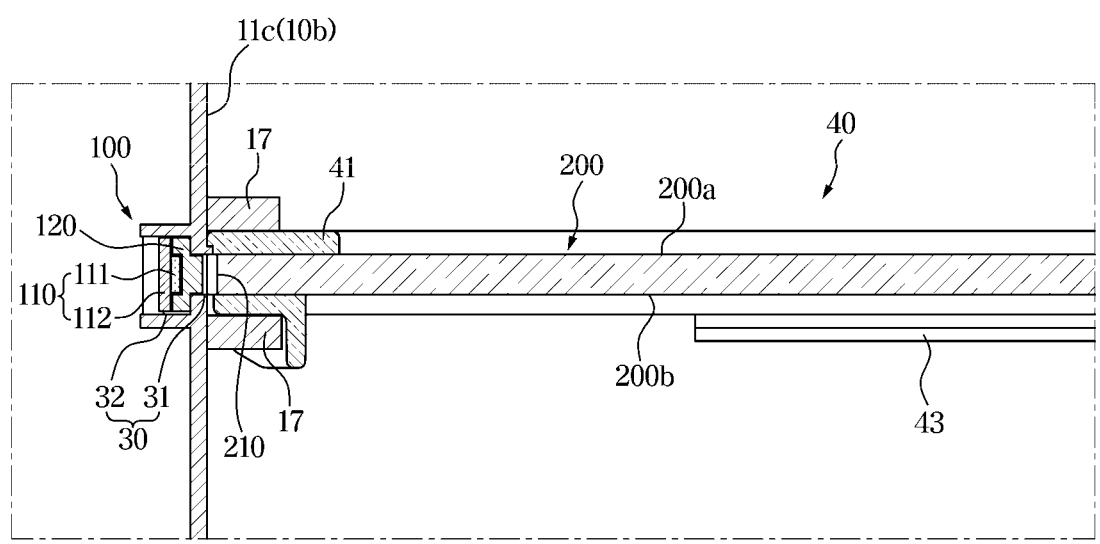
FIG. 4 illustrates a cross-sectional view taken along line A-A' of FIG. 1, which shows a light source and a shelf mounted on an inner case of a refrigerator according to an embodiment of the disclosure.
Figure 5:
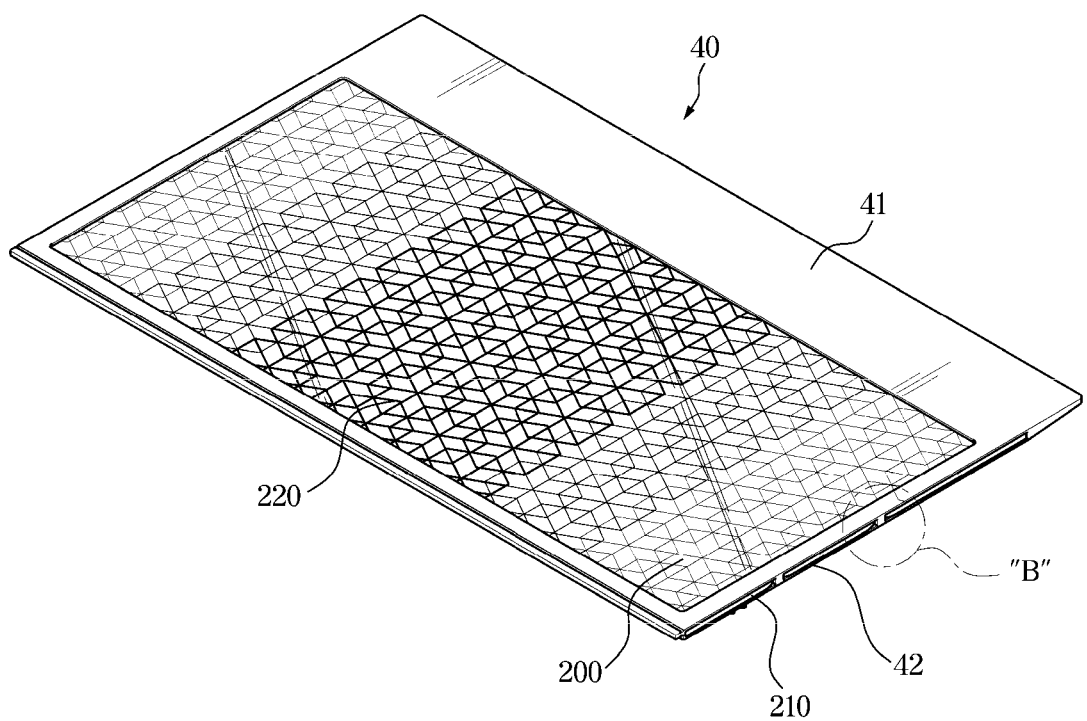
FIG. 5 illustrates a perspective view of a shelf according to an embodiment of the disclosure.
Figure 6:
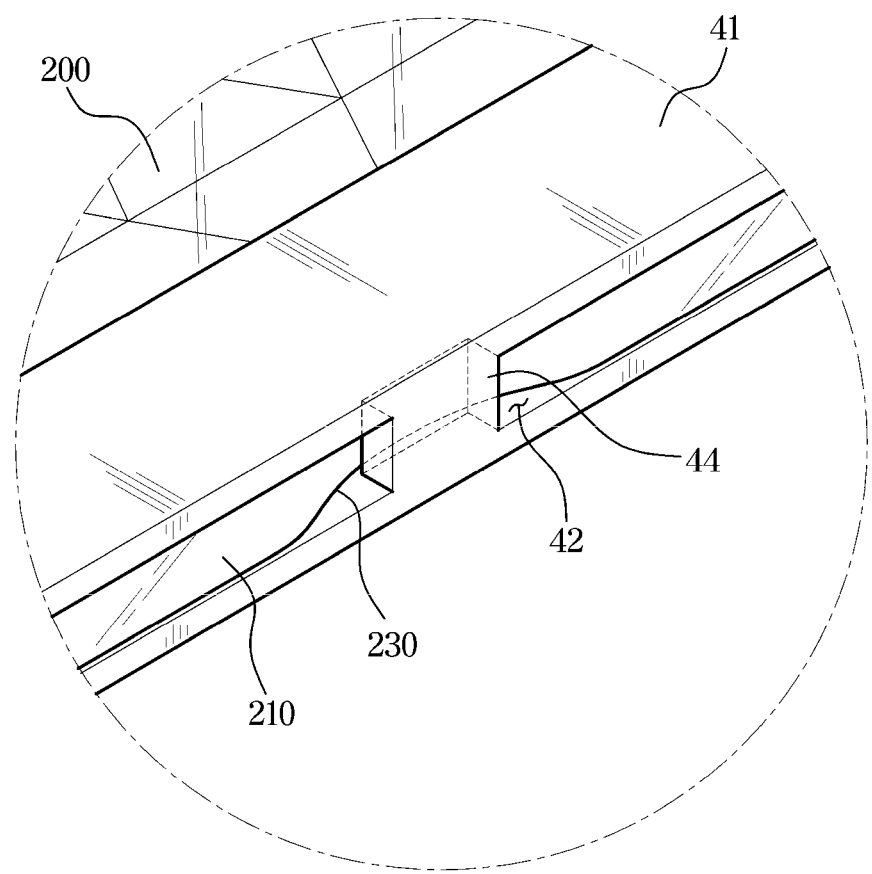
FIG. 6 illustrates an enlarged view of part B of FIG. 5, showing a support of a shelf according to an embodiment of the disclosure.
Figure 7:
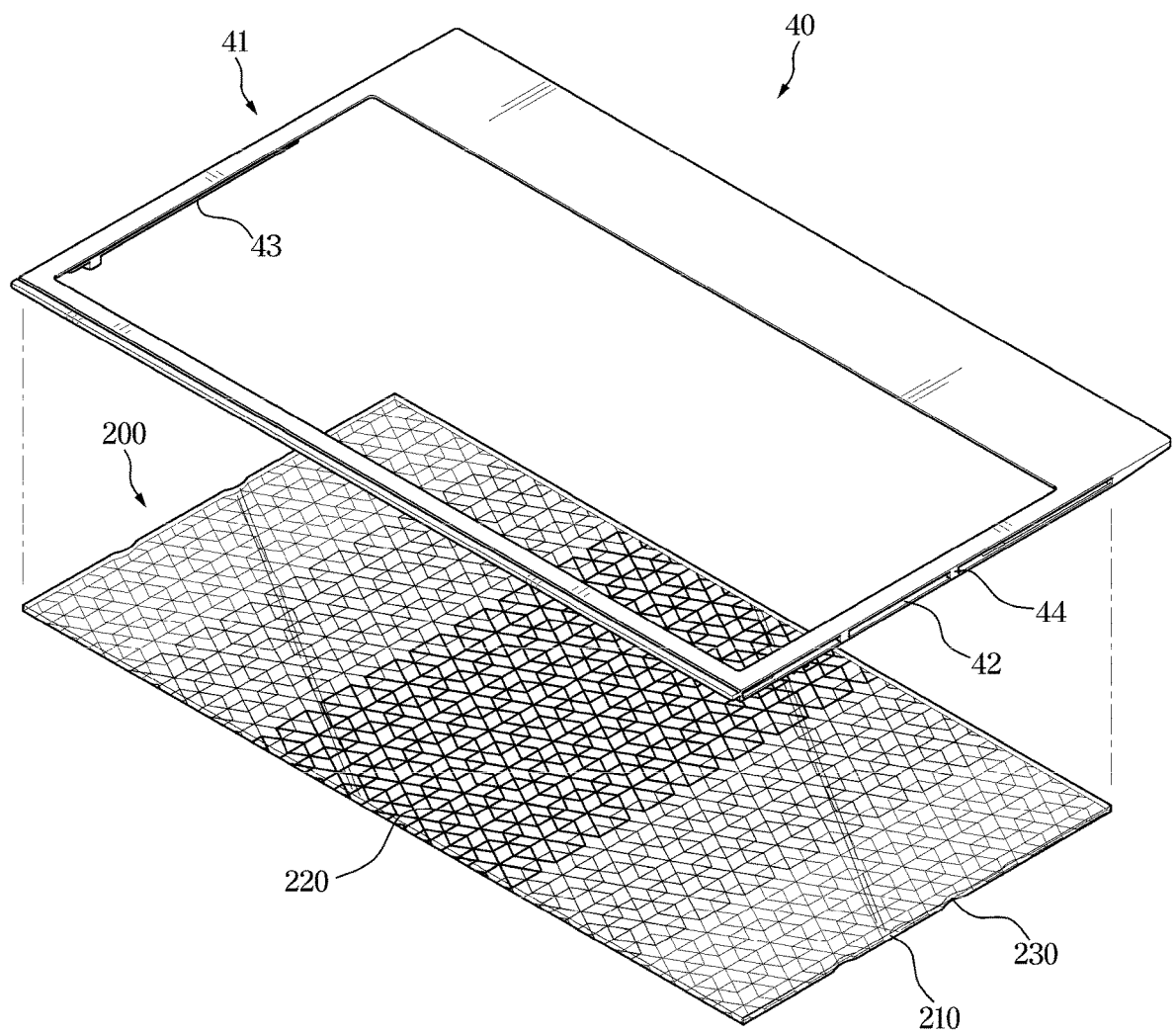
FIG. 7 illustrates a shelf and a light guide member according to an embodiment of the disclosure.
Figure 8:
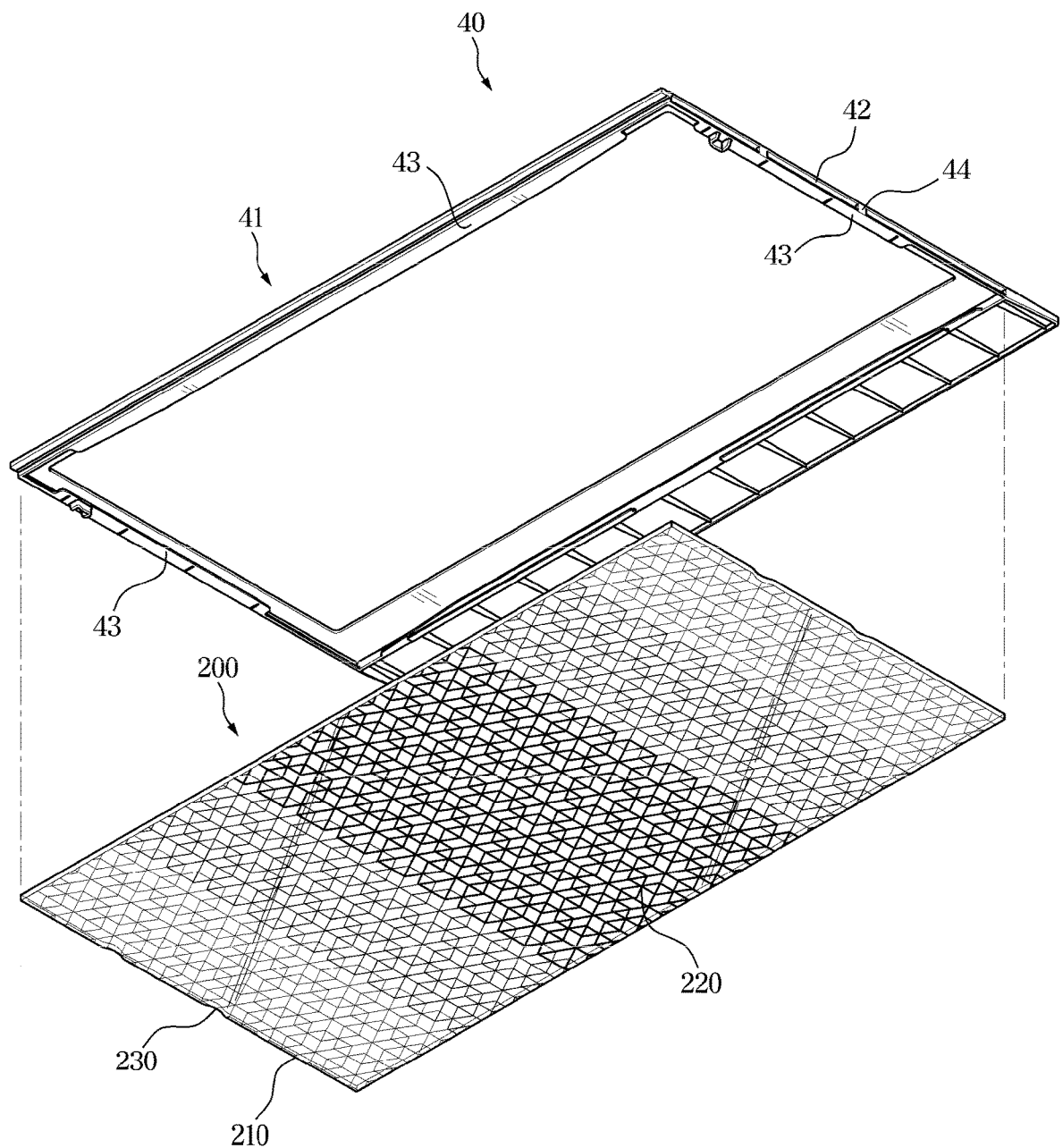
FIG. 8 illustrates a perspective view of a shelf and a light guide member according to an embodiment of the disclosure, which is viewed from the below.
Figure 9:
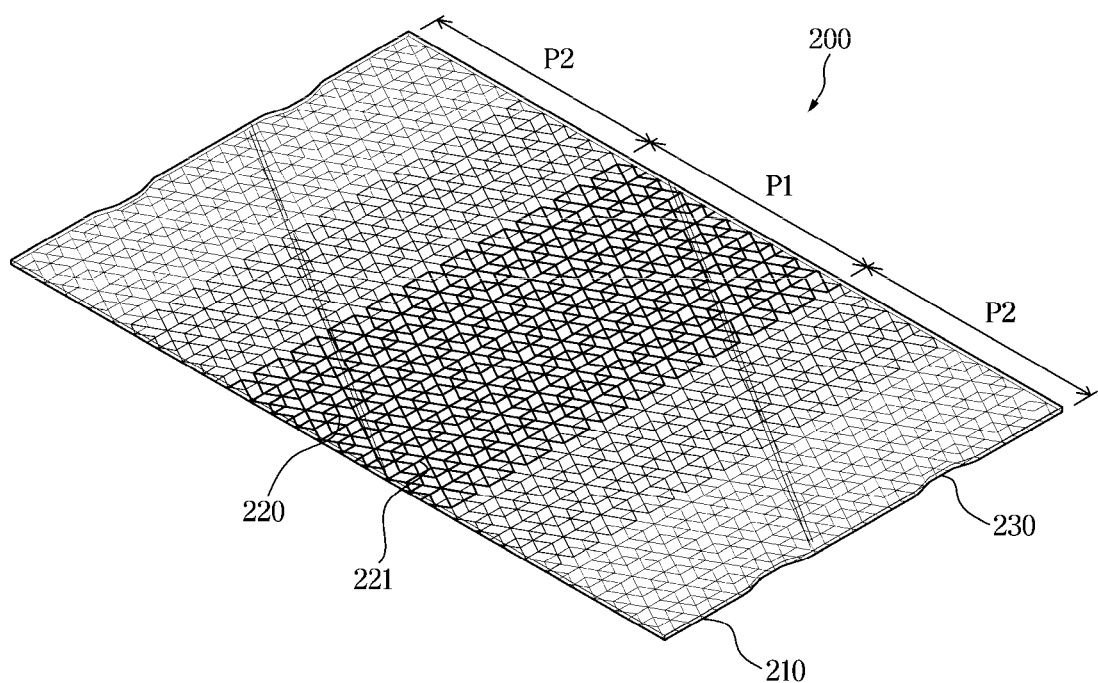
FIG. 9 illustrates a perspective view of a light guide member and a light guide pattern according to an embodiment of the disclosure.

FIG. 3 illustrates a light source mounted on an inner case of a refrigerator according to an embodiment of the disclosure, FIG. 4 illustrates a cross-sectional view taken along line A-A' of FIG. 1, which shows a light source and a shelf mounted on an inner case of a refrigerator according to an embodiment of the disclosure, FIG. 5 illustrates a perspective view of a shelf according to an embodiment of the disclosure, FIG. 6 illustrates an enlarged view of part B of FIG. 5, showing a support of a shelf according to an embodiment of the disclosure, FIG. 7 illustrates a shelf and a light guide member according to an embodiment of the disclosure, FIG. 8 illustrates a perspective view of a shelf and a light guide member according to an embodiment of the disclosure, which is viewed from the below, and FIG. 9 illustrates a perspective view of a light guide member and a light guide pattern according to an embodiment of the disclosure.

Referring to FIGS. 3 to 9, the lighting structure 100 may be provided to illuminate the inside of the storage chamber 11.

The lighting structure 100 may include a light source 110 and a light guide member 200 provided to guide light emitted from the light source 110.

The lighting structure 100 may include the light source 110 and a shelf 40 including the light guide member 200 provided to guide light emitted from the light source 110.

The light source 110 may be provided in at least a part of the inner case 10b of the cabinet 10. The light source 110 may be arranged in the front and rear side direction X of the cabinet 10. The light sources 110 may be arranged on the first sidewall 11c and the second sidewall 11d. The light source 110 may include a first light source 110a arranged on the first sidewall 11c and a second light source 110b arranged on the second sidewall 11d. A plurality of the first light sources 110a may be spaced apart from each other in the front and rear side direction of the storage chamber 11 on the first sidewall 11c. A plurality of the second light sources 110b may be spaced apart from each other in the front and rear side direction of the storage chamber 11 on the second sidewall 11d.

The cabinet 10 may be formed with a light source installation portion 30 for installing the light source 110. The light source installation portion 30 may include a light source installation hole 31 formed as an opening in the front and rear side direction X of the storage chamber 11.

The light source installation portion 30 may include a light source installation bracket 32 formed to extend from the inner case 10b so that the light source 110 is installed thereon. The light source installation holes 31 may be formed in the first sidewall 11c and the second sidewall 11d in the front and rear side direction X of the storage chamber 11. The light sources installation hole 31 may be arranged to face each other on the first sidewall 11c and the second sidewall 11d.

The support ribs 17 for supporting the shelf 40 may be provided on the lower side or the upper and lower sides of the light source installation portion 30. The support rib 17 may be installed at the lower side of the light source installation hole 31.

The support rib 17 may be provided so that the shelf 40 is positioned at the same height as the height of the light source 110, that is, the height of the light source installation portion 30. The support rib 17 may be arranged to support at least a portion of the shelf 40 so that the side surface of the shelf 40 corresponds to the light source installation hole 31. The support ribs 17 may be provided to support the shelf 40 such that both side surfaces of the shelf 40 face the light source installation holes 31.

The shelf 40 may further include a shelf frame 41 formed to be assembled to the light guide member 200. The light guide member 200 may be coupled to the shelf frame 41 and supported on the storage chamber 11.

The shelf frame 41 may be provided on the edge of the light guide member 200. The shelf frame 41 may be formed in a rectangular shape with an open center so as to correspond to the edge of the light guide member 200. The shelf frame 41 may be provided to be supported by the support rib 17 of the storage chamber 11. The shelf frame 41 may be formed to have a size corresponding to the inner surface of the storage chamber 11. The shelf frame 41 may be provided to secure the strength of the shelf 40. The shelf frame 41 may be provided to secure the strength of the light guide member 200.

The shelf frame 41 may be provided to cover the edge of the light guide member 200. The shelf frame 41 may be provided with a rest 43 for supporting the light guide member 200. The rest 43 may be provided to support a lower surface 200b of the light guide member 200. The shelf frame 41 may further include a support 44 provided to support a side surface of the light guide member 200. The support 44 may be provided to improve the strength of the shelf frame 41. The support 44 may be formed on at least a portion of the side surface of the shelf frame 41. The support 44 may include at least one rib.

The light guide member 200 may further include a curved portion 230 formed in a curved surface to correspond to the support 44. The curved portion 230 may be formed on at least a portion of the side surface of the light guide member 200. The curved portion 230 may be formed by processing at least a portion of the side surface of the light guide member 200 in a circular shape. In the embodiment of the disclosure, the support of the shelf and the curved portion of the glass panel are each provided in two units thereof, but the disclosure is not limited thereto. For example, the support of the shelf and the curved portion of the glass panel may be formed in various ways according to the size and the shape of the shelf.

The light source 110 may include a printed circuit board (PCB) 112 and a plurality of light emitting diodes (LEDs) 111 spaced apart from each other at a predetermined interval on the PCB 112. The PCB 112 may be arranged lengthwise along the front and rear side direction of the storage chamber 11. The PCB 112 may be arranged on the light source installation bracket 33 formed to be elongated on the first sidewall 11c and the second sidewall 11d. The plurality of LEDs 111 may be installed to be spaced apart from each other on the PCB 112. The plurality of LEDs 111 may be arranged to be directed toward the storage chamber 11.

The light source 110 may further include a lighting cover 120 provided to cover the plurality of LEDs 111. The lighting cover 120 may be provided to correspond to the light source installation hole 31. The lighting cover 120 may be provided to cover and protect the plurality of LEDs 111 installed on the PCB 112. The lighting cover 120 may be formed of a material that transmits light.

The lighting cover 120 may be formed in a size and shape capable of covering the plurality of LEDs 111.

The light guide member 200 may be provided to guide light emitted from the light source 110. The light guide member 200 may be provided to extend between the first sidewall 11c and the second sidewall 11d. The light guide member 200 may include a light incident portion 210 arranged to face the first sidewall 11c. The light guide member 200 may include a light incident portion 210 arranged to face the second sidewall 11d. The light guide member 200 may include an exit surface 220 through which light guided by the light guide member 200 is emitted to the outside.

The light guide member 200 may be formed in a rectangular plate shape. The light guide member 200 may include glass or poly methylmethacylate (PMMA) material. The light guide member 200 may be used as the shelf 40 for placing storage items, such as food.

The light guide member 200 may include the light incident portion 210 formed on at least a portion of the side surfaces of the light guide member 200, and a light guide pattern 221 formed on at least one of an upper surface 200a or a lower surface 200b of the light guide member 200.

The light incident portion 210 may be formed on the side surface of the light guide member 200. The light incident portion 210 may be formed on a part of the side surfaces formed between the upper surface 200a and the lower surface 200b of the light guide member 200. The light incident portion 210 may be formed to face the light source 110, that is, the LED 111. The light incident portion 210 may be arranged to come in close contact with the LED 111. The light incident portion 210 may be formed on at least one of the side surfaces of the light guide member 200. The light incident portion 210 may be formed on one of the side surfaces of the light guide member 200 corresponding to a side at which the light source 110 is arranged. The light incident portion 210 is provided such that light emitted through the lighting cover 120 of the light source 110 is transmitted through the light incident portion 210. The light incident portion 210 is positioned parallel to the light source 110. The light incident portion 210 is positioned parallel to the light source 110 so that light may be incident on the light incident portion 210 of the light guide member 200 in a parallel direction.

One side of the light incident portion 210 of the light guide member 200 may be arranged to face the first light source 110 installed on the first sidewall 11c. The other side of the light incident portion 210 of the light guide member 200 may be arranged to face the second light source 110 installed on the second sidewall 11d.

The light guide pattern 221 may be provided on the lower surface 200b of the light guide member 200. The light guide pattern 221 may be formed by at least one of printing or vitreous printing.

The light guide pattern 221 may be formed by printing on the lower surface 200b of the light guide member 200. The light guide pattern 221 may be formed by vitreous printing on the lower surface 200b of the light guide member 200. The light guide pattern 221 may include at least one of screen printing, injection, or stamping.

The light guide pattern 221 may have a thickness or density that increases toward the center of the light guide member 200 while decreasing toward an outside of the light guide member 200. For example, the light guide pattern 221 may have a diamond-shape whose thickness becomes thicker toward the center of the light guide member 200 and becomes thinner toward the outside of the light guide member 200. As the thickness of the light guide pattern 221 becomes thicker toward the center of the light guide member 200, light is provided to be uniformly emitted through the light guide pattern 221 even at an area distant from the light sources 110 arranged on the both sides of the light guide member 200.

The thickness and density of the light guide pattern 221 may be changed by various variables such as the intensity of the light source 110 or the arrangement of the LEDs 111.

The light guide pattern 221 may have a diamond shape. The light guide pattern 221 may improve light uniformity by varying the thickness of the diamond shape. The light guide pattern 221 may improve light uniformity by varying the density of the diamond shapes.

The density of the light guide pattern 221 formed on the light guide member 200 may be variously adjusted. For example, the light guide pattern 221 may have different densities between a first region P1 that is the center of the light guide member 200 and both end portions P2 of the first region P1. The light guide pattern 221 may be set to have a great thickness in the first region P1 of the light guide member 200 and a small thickness in the second region P2 of the light guide member 200 to be thinner than that of the first region P1. The light guide pattern 221 may have different densities between the first region P1 of the light guide member 200 and a second region P2 except for the first region P1 of the light guide member 200.

The coating density of the light guide pattern 221 may increase as distance from the edge portion of the light guide member 200 increases. The coating density may be changed by the amount of light emitted from the light source 110.

The light source 110 may be incident on the light incident portion 210 of the light guide member 200 in a horizontal direction, reflected through the light guide pattern 221, and evenly spread to the upper surface of the light guide member 200. In the embodiment of the disclosure, the light guide pattern 221 is illustrated as having a diamond shape, but the scope of the disclosure is not limited thereto. For example, the light guide pattern may include at least one shape of a circle, an oval, a square, or a polygon.

The light incident portion 210 of the light guide member 200 is subject to a gloss treatment such that the intensity of light emitted from the light source 110 may be adjusted. The light incident portion 210 of the light guide member 200 is subject to a predetermined pattern treatment such that the intensity of light emitted from the light source 110 may be adjusted. The light incident portion 210 of the light guide member 200 is subject to a gloss treatment or a pattern treatment to prevent unevenness of light and diffuse reflection of light.

The shelf frame 41 is provided on at least a portion thereof with an opening 42 formed to correspond to the plurality of LEDs 111. The opening 42 may be formed on a part of the side surface of the shelf frame 41. The opening 42 may allow the light incident portion 210 provided on the side surface of the light guide member 200 to make close contact with the light source 110. The closer the distance between the light incident portion 210 of the light guide member 200 and the light source 110 is, the stronger the light transmitted from the light source 110 may be. As the light incident portion 210 of the light guide member 200 and the light source 110 make close contact with each other, the stronger light may be transmitted from the light source 110, and light is emitted through the surface of the light guide member 200 of the shelf 40 through the light guide pattern 221 of the light guide member 200, so that the effect of indirect lighting may be obtained.

Figure 10:
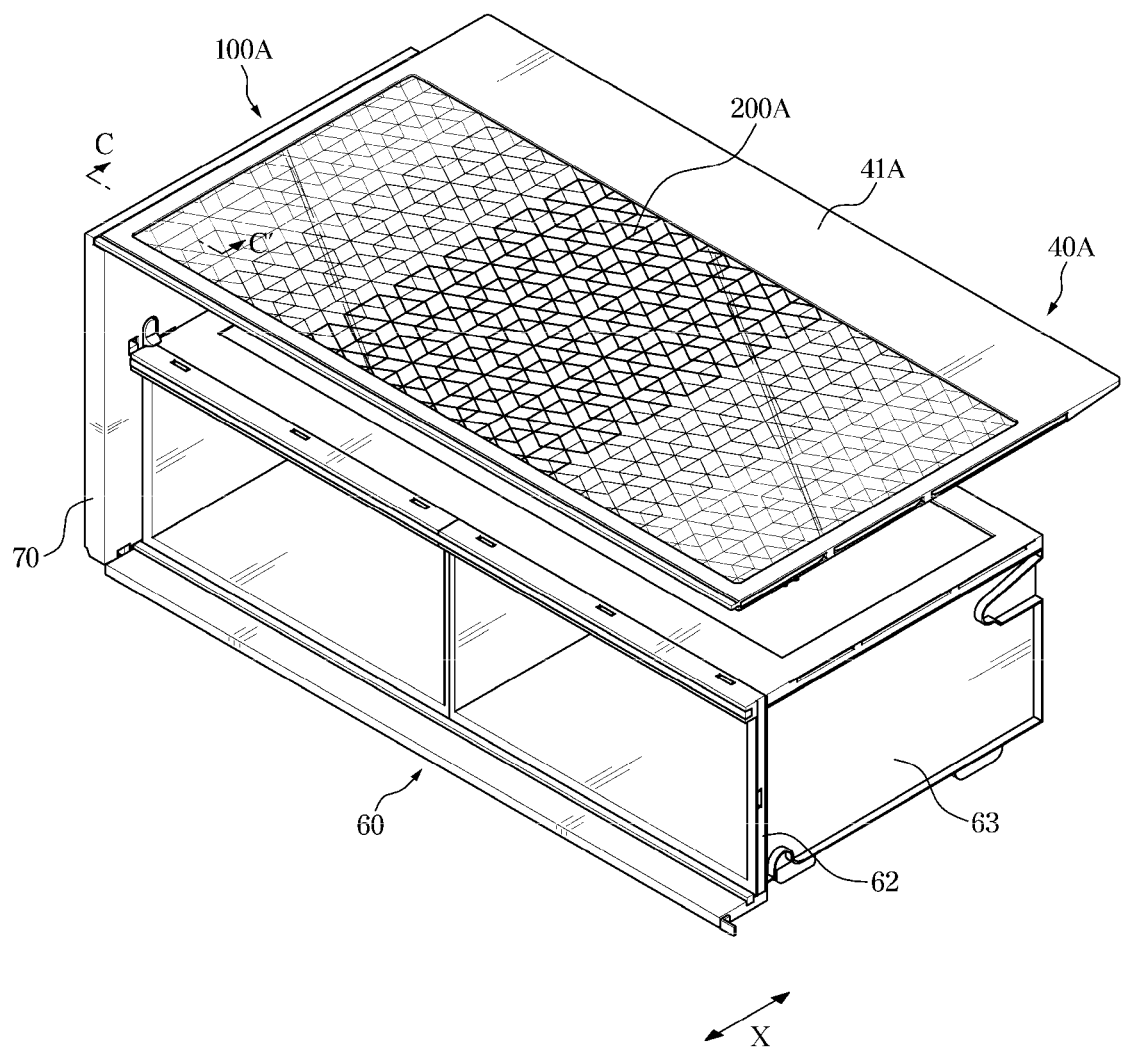
FIG. 10 illustrates a lighting structure and a shelf mounted on a bracket according to another embodiment of the disclosure.
Figure 11:
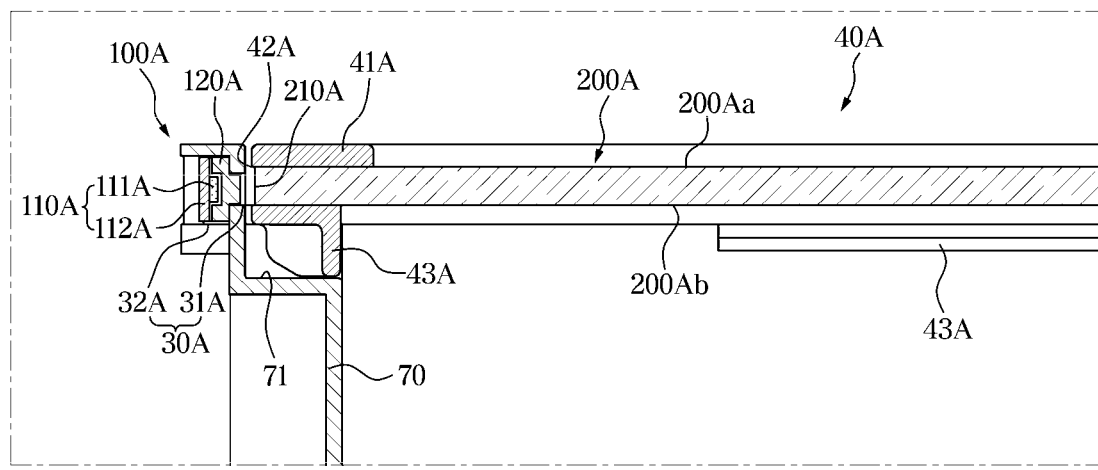
FIG. 11 illustrates a cross-sectional view taken along line C-C' of FIG. 10, showing a lighting structure according to another embodiment of the disclosure.

FIG. 10 illustrates a lighting structure and a shelf mounted on a bracket according to another embodiment of the disclosure, and FIG. 11 illustrates a cross-sectional view taken along line C-C' of FIG. 10, showing a lighting structure according to another embodiment of the disclosure. Reference numerals not shown in the drawings are referred to FIGS. 1 to 9.

Referring to FIGS. 10 and 11, a lighting structure 100A may be provided to illuminate the inside of the storage chamber 11.

The storage chamber 11 of the refrigerator 1 may be provided with a bracket 70 for installing the shelf 40A, the drawer 50, a basket (not shown), or other separate components.

The bracket 70 may be formed integrally with the inner case 10b of the storage chamber 11, or may be provided separately from and additionally installed on the inner case 10b.

The bracket 70 may be provided with a shelf support portion 71 for supporting the shelf 40A. The shelf support portion 71 may be provided on the upper end of the bracket 70.

The bracket 70 may be formed with a light source installation portion 30 for installing the light source 110. The light source installation portion 30 may be located at the upper end of the bracket 70. The light source installation portion 30 may be formed adjacent to the shelf support portion 71 of the bracket 70. In the embodiment of the disclosure, the light source installation portion and the shelf support portion are illustrated as being formed on the upper end of the bracket, but the scope of the disclosure is not limited thereto. For example, the light source installation portion and the shelf support portion may be located in the middle or at the lower end of the bracket.

The light source installation portion 30 includes a light source installation hole 31 formed as an opening in the front and rear side direction X of the storage chamber 11, and a light source installation bracket 32 formed to extend from the inner case 10b so that the light source 110 is installed thereon.

The light source installation portion 30 may be provided at a lower side thereof with the shelf support portion 71 for supporting the shelf 40A. The shelf support portion 71 may be provided at a lower side of the light source installation hole 31. The shelf support portion 71 may be formed to support the shelf 40A such that the side surface of the shelf 40A is supported at the same height as the light source installation hole 31. The lighting structure 100A may include a light source 110A and a light guide member 200A provided to guide light emitted from the light source 110A. The lighting structure 100A may include the light source 110A and the shelf 40A including the light guide member 200A provided to guide light emitted from the light source 110A.

Since the detailed configuration and operation of the lighting structure 100A including the above-described configuration is the same as in the above embodiment, a redundant description will be omitted.

Figure 12:
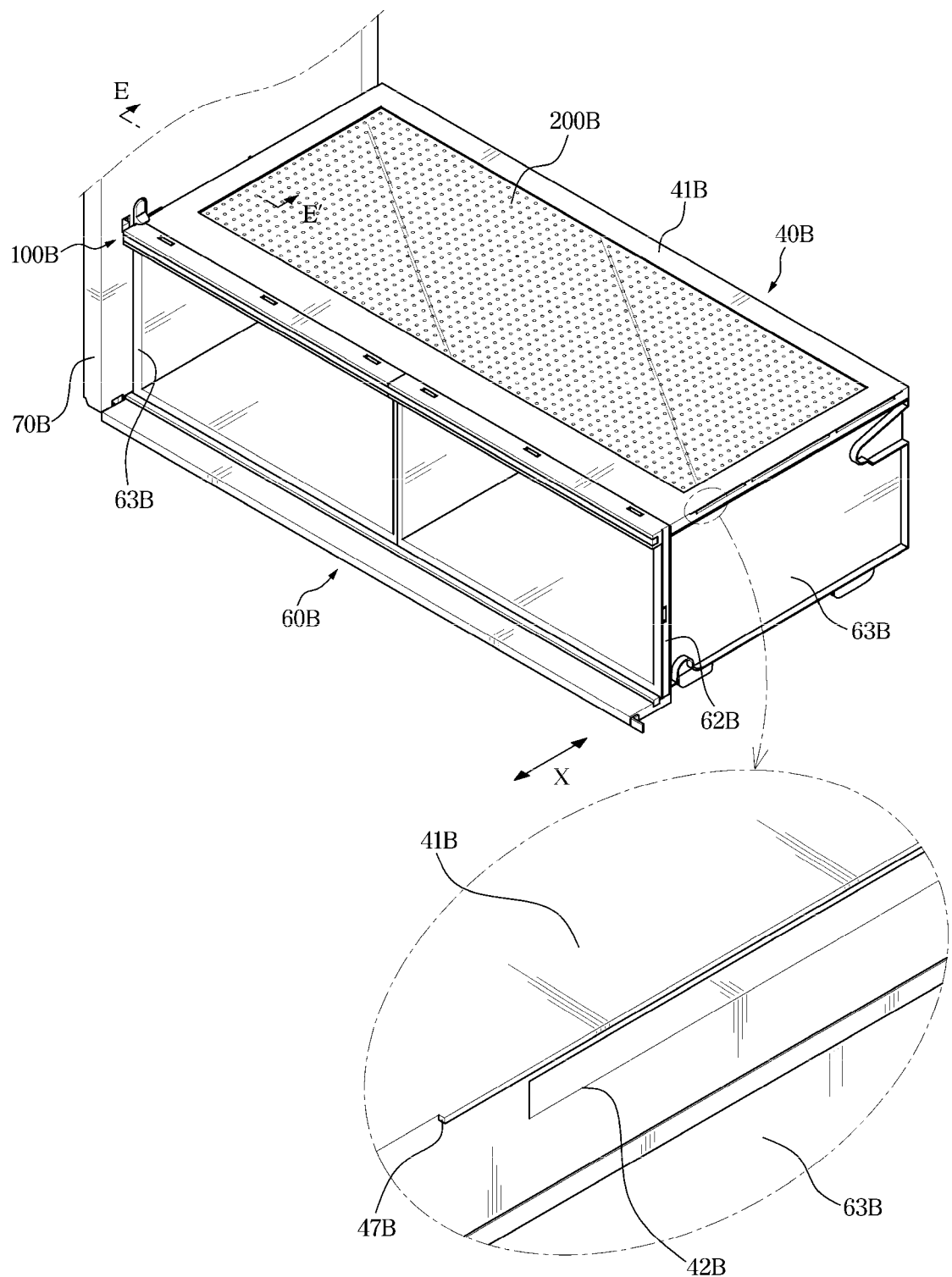
FIG. 12 illustrates a perspective view of a lighting structure and a shelf mounted on a drawer case according to another embodiment of the disclosure.
Figure 13:
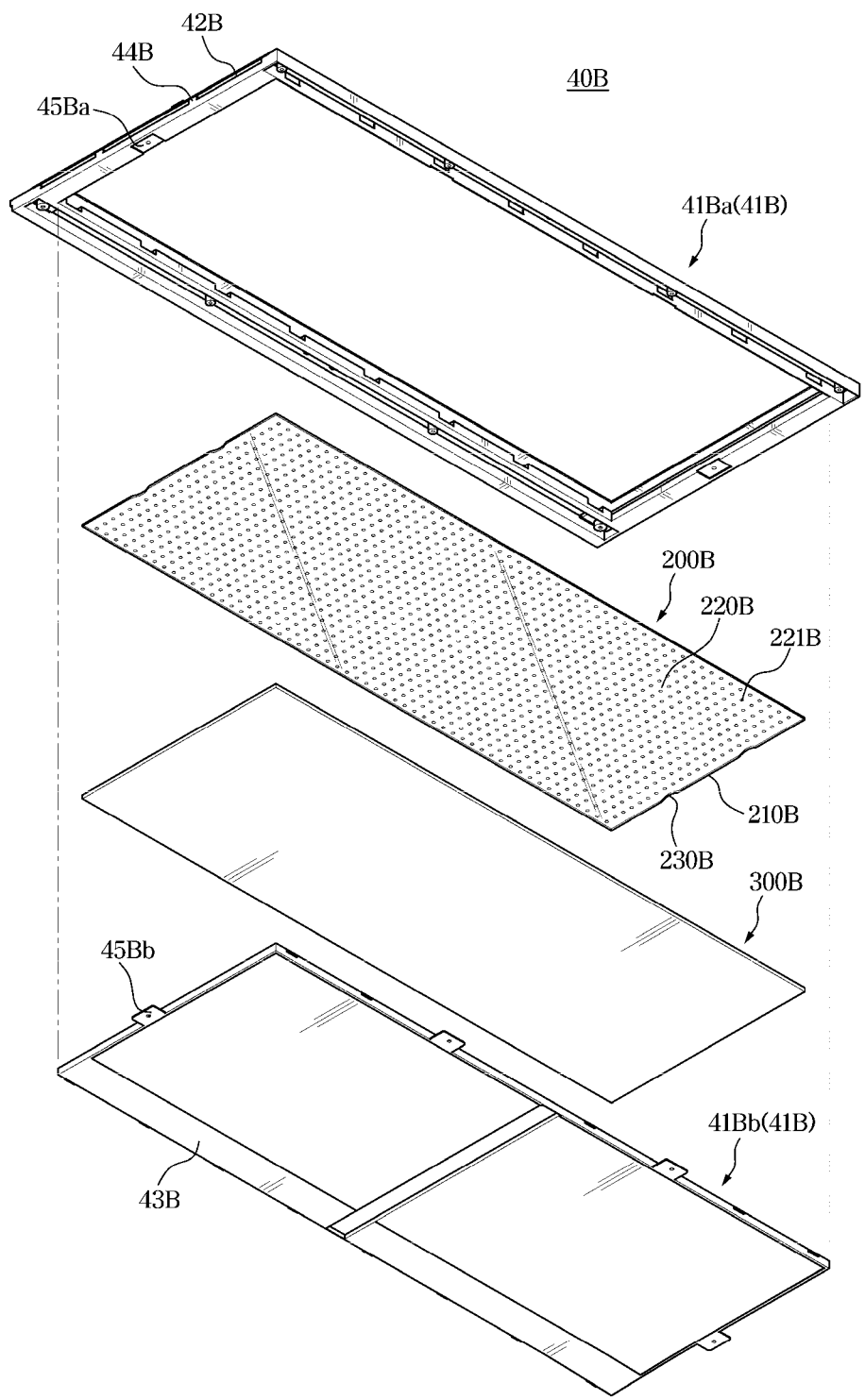
FIG. 13 illustrates an exploded perspective view of a shelf on which a light guide member is mounted according to another embodiment of the disclosure.
Figure 14:
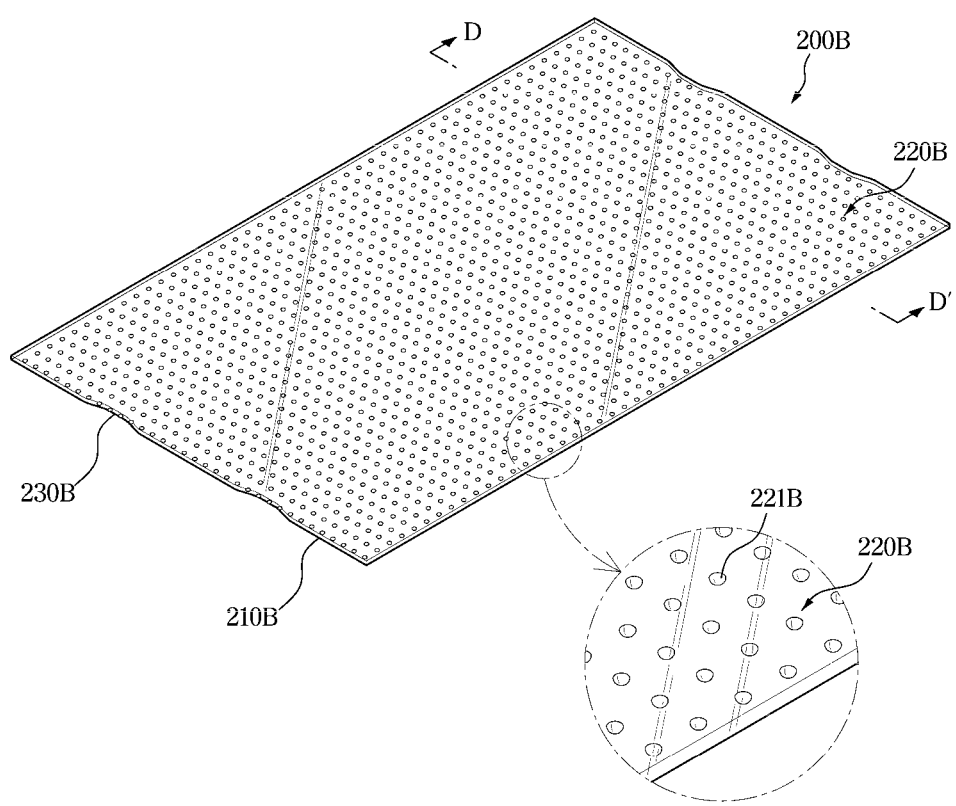
FIG. 14 illustrates a light guide member according to still another embodiment of the disclosure.
Figure 15:
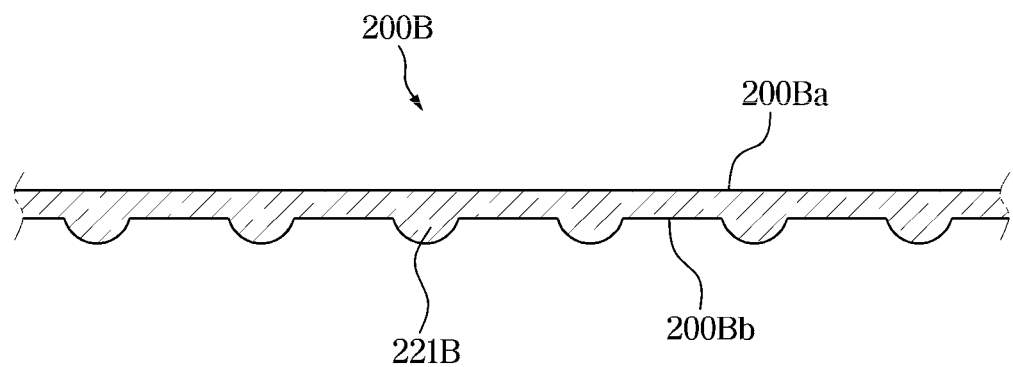
FIG. 15 illustrates a cross-sectional view taken along line D-D' of FIG. 14, showing a light guide pattern according to still another embodiment of the disclosure.
Figure 16:
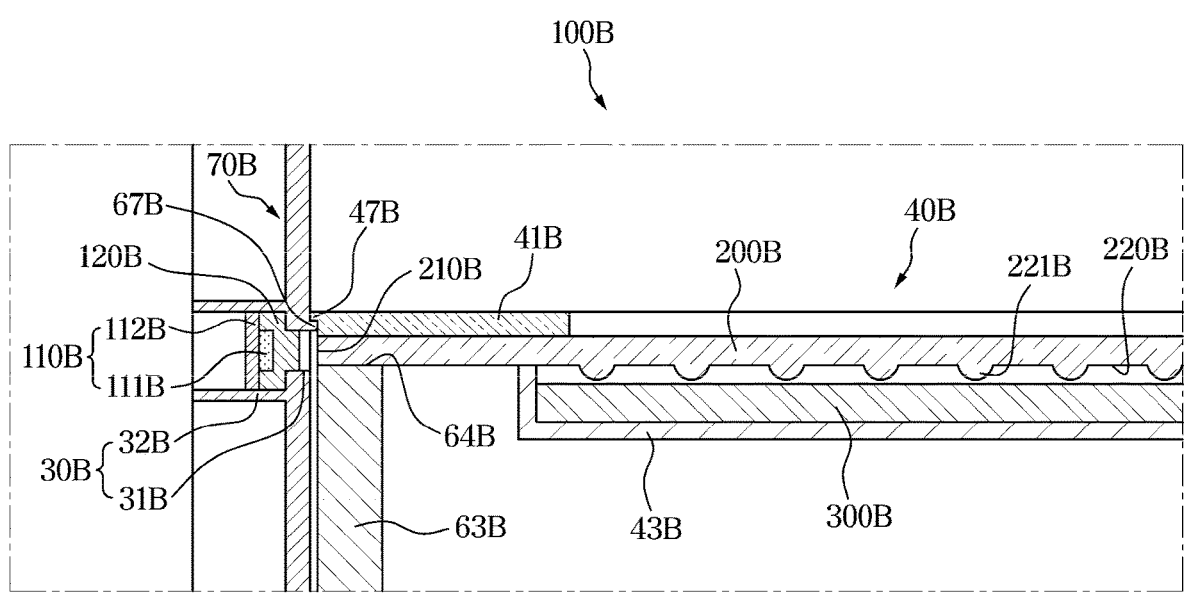
FIG. 16 illustrates a cross-sectional view taken along line E-E' of FIG. 12, showing a lighting structure according to still another embodiment of the disclosure.

FIG. 12 illustrates a perspective view of a lighting structure and a shelf mounted on a drawer case according to another embodiment of the disclosure, FIG. 13 illustrates an exploded perspective view of a shelf on which a light guide member is mounted according to another embodiment of the disclosure, FIG. 14 illustrates a light guide member according to still another embodiment of the disclosure, FIG. 15 illustrates a cross-sectional view taken along line D-D' of FIG. 14, showing a light guide pattern according to still another embodiment of the disclosure, and FIG. 16 illustrates a cross-sectional view taken along line E-E' of FIG. 12, showing a lighting structure according to still another embodiment of the disclosure. Reference numerals not shown in the drawings will be referred to FIGS. 1 to 9.

Referring to FIGS. 12 to 16, a lighting structure 100B may be provided to illuminate the inside of the storage chamber 11.

The storage chamber 11 of the refrigerator 1 may be provided with a drawer case 60B for installing the drawer 50. The drawer case 60B is provided in the storage chamber 11 such that the drawer 50 may be inserted into or withdrawn from the drawer case 60B. In the embodiment of the disclosure, the drawer case is provided separately from and mounted to the storage chamber 11, but the scope of the disclosure is not limited thereto. For example, the drawer case for mounting the drawer thereon may be integrally formed with the inner case of the storage chamber.

The drawer case 60B is provided to accommodate the drawer 50 in the storage chamber 11. The drawer case 60B may include a front frame 62B having an opening formed to accommodate the drawer 50 and a side frame 63B provided to cover a side surface of the drawer 50.

The drawer case 60B may be provided with a support 64B for supporting the shelf 40B. The support 64B may be formed on the upper end of the side frame 63B of the drawer case 60B. The shelf 40B may be supported on the support 64B of the drawer case 60B.

The drawer case 60B is provided at both sides thereof with brackets 70B to cover the outside of the drawer case 60B.

The bracket 70B may be provided with a light source installation portion 30B for installing a light source 110B. The light source installation portion 30B may be provided adjacent to the support 64B of the drawer case 60B.

The light source installation portion 30B is provided with a light source installation hole 31B formed as an opening in the front and rear side direction X of the storage chamber 11, and a light source installation bracket 32B formed to extend rearward of the light source installation hole 31B so that the light source 110B is installed thereon.

The support 64B of the drawer case 60B may be provided so that the shelf 40B is positioned in line with the light source installation hole 31B.

The support 64B may have the upper end positioned at the lower end of the light source installation hole 31B so that the side surface of the shelf 40B supported on the upper end of the support 64B corresponds to the light source installation hole 31B.

The lighting structure 100B may include a light source 110B and a light guide member 200B provided to guide light emitted from the light source 110B.

The shelf 40B includes the light guide member 200B formed in a rectangular plate shape, a reflective member 300B arranged on at least one surface of the light guide member 200B, and a shelf frame 41B provided to support the light guide member 200B.

The reflective member 300B may include a light guide plate provided to disperse light incident from the light source 110B. The reflective member 300B may be arranged at a lower side of the light guide member 200B.

The light guide member 200B may include a light incident portion 210B formed on at least a portion of the side surface of the light guide member 200B, and an exit surface 220B formed on at least one of an upper surface 200Ba or a lower surface 200Bb of the light guide member 200B.

The light incident portion 210B may be formed on the side surface of the light guide member 200B. The light incident portion 210B may be formed to face the light source 110B, that is, the LED 111B. The light incident portion 210B may be arranged to come in close contact with the LED 111B. The light incident portion 210B may be formed on one of the side surfaces of the light guide member 200B corresponding to a side at which the light source 110B is arranged. The light incident portion 210B is provided such that light emitted through the lighting cover 120B of the light source 110 is transmitted through the light incident portion 210B. The light incident portion 210 is positioned parallel to the light source 110B. The light incident portion 210B is positioned parallel to the light source 110B so that light may be incident on the light incident portion B 210 of the light guide member 200B in a parallel direction.

An exit surface 220B may be provided on the lower surface 200Bb of the light guide member 200B. In this case, the exit surface 220B may be injection-molded integrally with the light guide member 200B.

The exit surface 220B may include a light guide pattern 221B in an embossed shape. The embossed shape may be formed to protrude from the lower surface 200Bb of the light guide member 200B as a unitary body with the light guide member 200B.

At least one surface of the reflective member 300B may be subjected to a predetermined pattern treatment so that light transmitted from the light source 110B may be uniformly reflected.

The reflective member 300B is arranged between the storage chamber 11 and the drawer 50 to prevent cold air of the storage chamber 11 from being transmitted to the drawer 50. The reflective member 300B may be arranged below the light guide member 200B and above the drawer 50 to have an effect of heat insulation preventing the cold air from being transmitted to the drawer 50.

The shelf 40B may further include a shelf frame 41B on which the light guide member 200B and the reflective member 300B are supported. The light guide member 200B and the reflective member 300B may be coupled to the shelf frame 41B and supported on the storage chamber 11.

The shelf frame 41B may be provided to cover the edges of the light guide member 200B and the reflective member 300B. The shelf frame 41B may include a first shelf frame 41Ba provided at an upper side and a second shelf frame 41Bb provided at a lower side and coupled to the first shelf frame 41Ba. The shelf frame 41B may be provided to secure the strength of the shelf 40B.

The first shelf frame 41Ba may be formed in a rectangular shape with an open center so as to correspond to the edges of the light guide member 200B and the reflective member 300B. The first shelf frame 41Ba may further include a support 44B provided to support a side surface of the light guide member 200B or the reflective member 300B.

The first shelf frame 41Ba may be provided in at least a part thereof with an opening 42B formed to correspond to the plurality of LEDs 111B. The opening 42B may be formed on a part of the side surface of the first shelf frame 41Ba. The opening 42B may be positioned parallel to the support 44B. The opening 42B may allow the light incident portion 210B positioned on the side surface of the light guide member 200B to make close contact with the light source 110B.

The opening 42B may allow the light incident portion 210B positioned on the side surface of the light guide member 200B to make close contact with the light source 110B. A guide rib 47B may be provided on the shelf frame 41B so that the light incident portion 210B of the light guide member 200B may come into close contact with the light source 110B. The guide rib 47B may be formed to protrude outward on the upper surface of the shelf frame 41B. The guide ribs 47B may be formed to protrude outward on both side portions of the upper surface of the shelf frame 41B. A guide protrusion 67B corresponding to the guide rib 47B may be formed in the light source installation portion 30B of the bracket 70. The guide protrusion 67B may be formed to extend on the upper end of the light source installation hole 31B. With the guide rib 47B and the guide protrusion 67B, the light incident portion 210B of the light guide member 200B may be provided to make further close contact with the light source 110B.

The closer the distance between the light incident portion 210B of the light guide member 200B and the light source 110B is, the stronger the light transmitted from the light source 110B may be. As the light incident portion 210B of the light guide member 200B and the light source 110B make close contact with each other, the stronger light may be transmitted from the light source 110B, and light is emitted through the exit surface 220B of the light guide member 200B, so that the effect of indirect lighting may be obtained.

The second shelf frame 41Bb may be provided with a rest 43B for supporting the reflective member 300B. The rest 43B may be provided to support a lower surface 200Bb of the reflective member 300B.

The first shelf frame 41Ba and the second shelf frame 41Bb may be provided with a first fastening portion 45Ba and a second fastening portion 45Bb, respectively, for fastening. The first fastening portion 45Ba may be provided on the first shelf frame 41Ba, and the second fastening portion 45Bb may be provided on the second shelf frame 41Bb. The first shelf frame 41Ba and the second shelf frame 41Bb may be coupled to each other by the first fastening portion 45Ba and the second fastening portion 45Bb.

Since the detailed configuration and operation of the lighting structure 100B including the above-described configuration is the same as in the above embodiment, a redundant description will be omitted.

Figure 17:
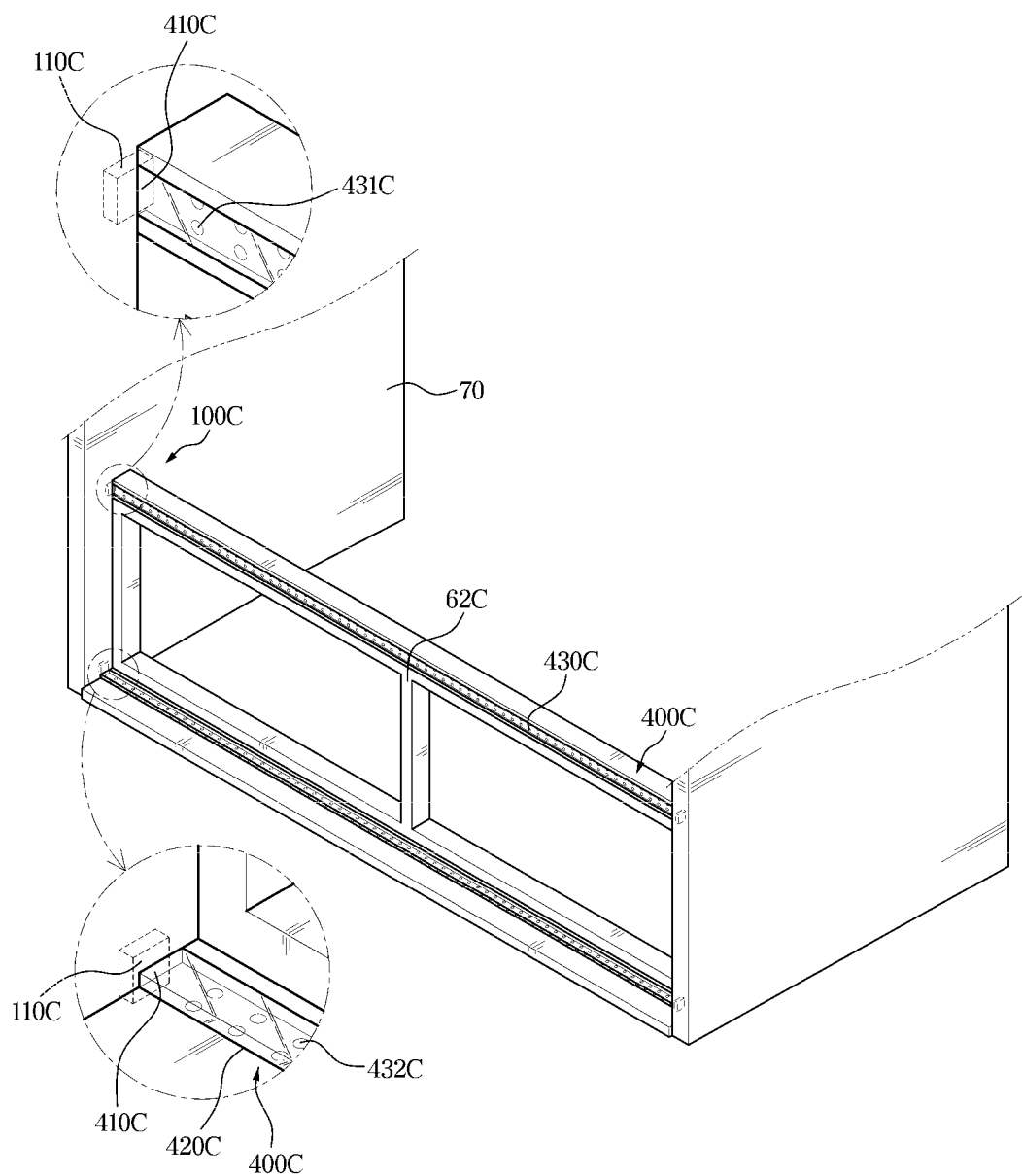
FIG. 17 illustrates a drawer case on which a light guide member is provided according to still another embodiment of the disclosure.

FIG. 17 illustrates a drawer case provided with a light guide member according to still another embodiment of the disclosure. Reference numerals not shown in the drawings will be referred to FIGS. 1 to 9.

Referring to FIG. 17, a lighting apparatus 100C may further include a light source 110C and a light guide member 400C arranged to face the light source 110C. The light source 110C may be arranged on at least one of the first sidewall 11c and the second sidewall 11d. In addition, the light source 110C may be installed on the bracket 70.

The light guide member 400C may include glass or poly methylmethacylate (PMMA) material. The light guide member 400C may be formed in a bar shape. The light guide member 400C may be formed in the shape of a hexahedral strip that is elongated in the width direction of the storage chamber 11. The light guide member 400C may be provided to extend between the first sidewall 11c and the second sidewall 11d.

The light guide member 400C may be arranged on a front frame 62C of the drawer case 60. The light guide member 400C is provided to receive light from the light source 110C and uniformly distribute the received light to the front.

The light guide member 400C may include an incident surface 410C arranged to face the light source 110C and an exit surface 420C including a light guide pattern 430C.

The light guide member 400C may further include a light guide pattern 430C. The light guide pattern 430C may include at least one shape of a circle, an oval, a quadrangle, a polygon, or a diamond.

The light guide pattern 430C includes a first pattern 431C formed on the rear surface of the light guide member 400C and provided to allow the light transmitted from the light source 110C to be uniformly emitted to the front of the storage chamber 11.

The light guide pattern 430C includes a second pattern 432C formed on the bottom surface of the light guide member 400C and provided to allow the light transmitted from the light source 110C to be uniformly emitted upward of the storage chamber 11.

Accordingly, light of the light source 110C may be uniformly emitted forward or upward of the cabinet 10 by the light guide member 400C.

Since the detailed configuration and operation of the lighting apparatus 100C including the above-described configuration is the same as those of the above-described embodiments, redundant description will be omitted.

Figure 18:
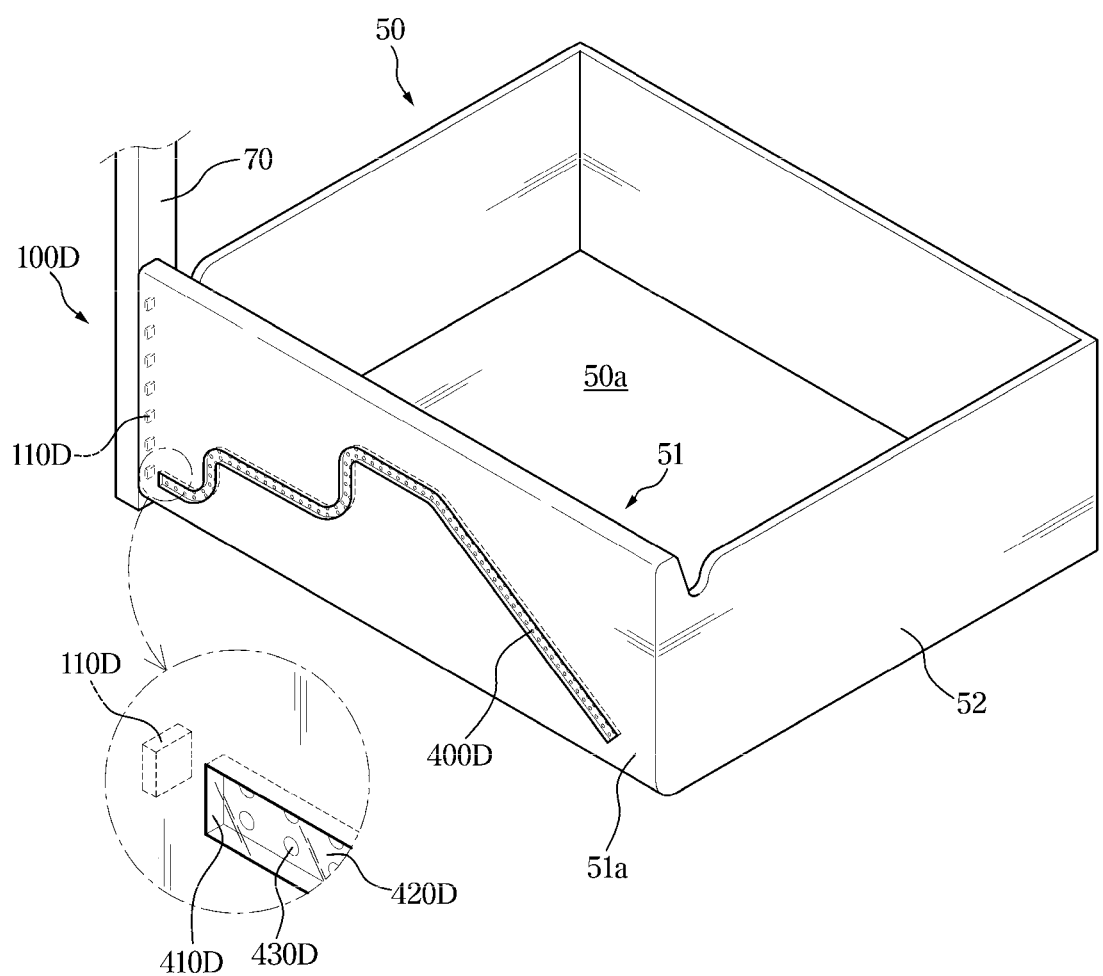
FIGS. 18 to 19 illustrate a drawer on which a light guide member is provided according to still another embodiment of the disclosure.
Figure 19:
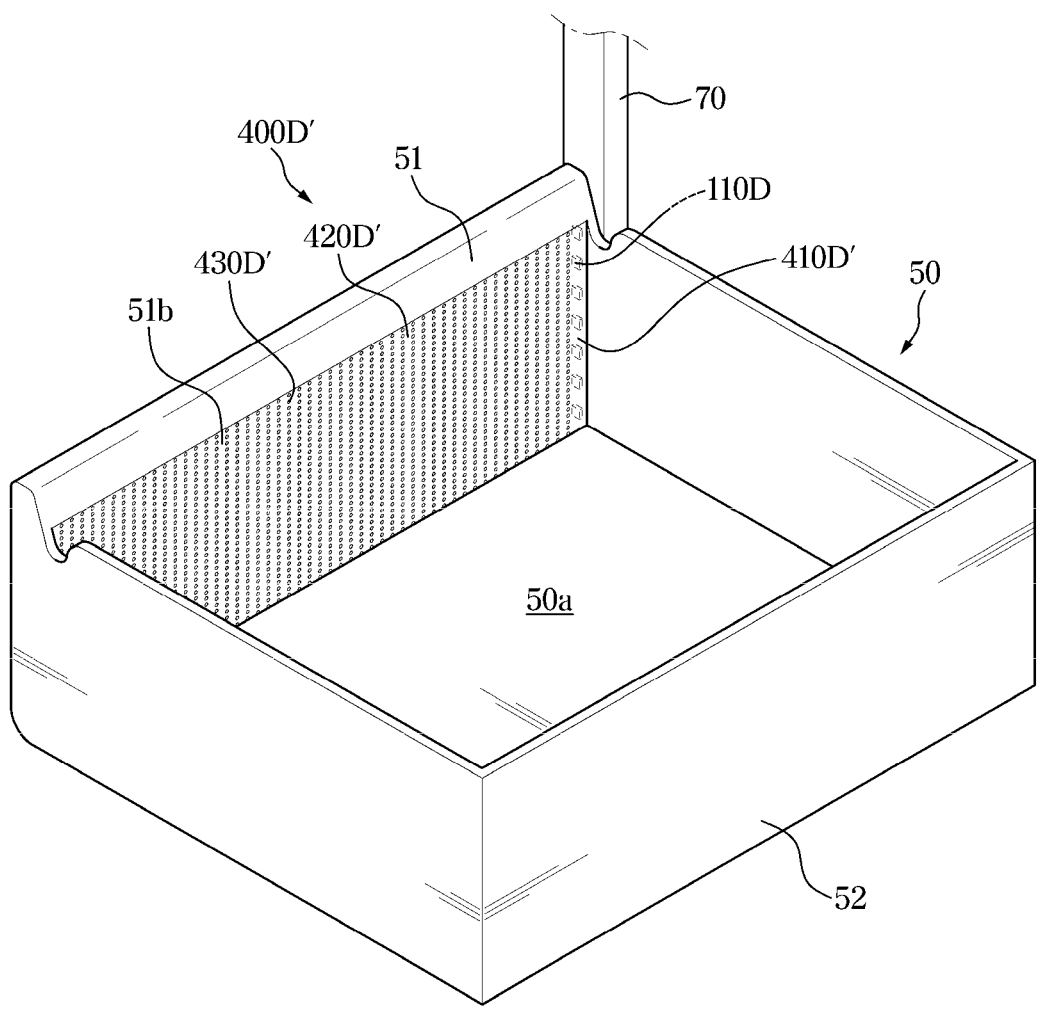

FIGS. 18 to 19 illustrates a drawer on which a light guide member is provided according to still another embodiment of the disclosure. Reference numerals not shown in the drawings will be referred to FIGS. 1 to 9.

Referring to FIGS. 18 to 19, a lighting apparatus 100D may further include light sources 110D and light guide members 400D and 400D' arranged to face the light sources 110D.

The light sources 110D may be located on both the first and second sidewalls 11c and 11d of the cabinet 10. The light source 110D may be arranged on at least one of the first sidewall 11c and the second sidewall 11d. The light source 110D may be installed on the bracket 70.

The light guide member 400D may include glass or poly methylmethacylate (PMMA) material. The light guide member 400D may be provided between the first sidewall 11c and the second sidewall 11d.

The light guide member 400D may include an incident surface 410D arranged to face the light source 110D and an exit surface 420D including a light guide pattern 430D.

The light guide pattern 430D may include at least one shape of a circle, an oval, a quadrangle, a polygon, or a diamond.

The light guide member 400D may be provided on the drawer 50. The drawer 50 includes a storage space 50a to store food therein. The drawer 50 may include a drawer body 52 forming the external appearance thereof and a front panel 51 forming a front surface of the external appearance of the drawer body 52.

At least one surface of the drawer body 52 may be formed to be open. In detail, the upper surface of the drawer body 52 may be formed to be open.

The front panel 51 of the drawer 50 may be provided to be directed to the front of the storage chamber 11. The front panel 51 may be formed of a transparent material so that the user may check the condition of food in the storage space 50a.

The light guide member 400D may be provided on the front panel 51 of the drawer 50. The light guide member 400D may be formed of the same material as that forming the front panel 51 or material different from that forming the front panel 51. The light guide member 400D may be double-injection or insert-injection-molded from a material different from that forming the front panel 51.

The light guide member 400D is provided to receive light from the light source 110D arranged to face the light guide member 400 through the incident surface 410D, and uniformly distribute the light forward through the exit surface 420D. The light guide member 400D may be formed in a strip shape having a degree of freedom. The light guide member 400D may be formed in a strip shape.

The light guide pattern 430D may be formed on the rear surface of the light guide member 400D and may be provided to allow the light transmitted from the light source 110D to be uniformly emitted to the front of the storage chamber 11.

In addition, the light guide pattern 430D' may be formed on at least one of the front surface 51a or the rear surface 51b of the front panel 51 of the drawer 50. The light guide pattern 430D' may be formed on the rear surface 51b of the front panel 51. The light guide pattern 430D' may be formed by printing in a circular dot shape on the rear surface 51b of the front panel 51 of the drawer 50.

Accordingly, light of the light source 110D incident through the incident surface 410D' of the light guide member 400D' is uniformly transmitted to the exit surface 420D' through the light guide pattern 430D' provided on the front panel 51 of the drawer 50.

Since the detailed configuration and operation of the lighting apparatus 100D including the above-described configuration is the same as those of the above-described embodiments, redundant description will be omitted.

As is apparent from the above, the lighting device can be improved to have an indirect lighting function in which light from a light source is transmitted through a side surface of a shelf.

In addition, a reflective member or an incident portion of glass is subjected to gloss or surface treatment so that light generated from a side surface of a glass shelf can be uniformly emitted over the entire area of the shelf and the intensity of light can be controlled.

In addition, the indirect lighting function can alleviate discomfort of a consumer due to glare or the like caused by direct irradiation of light.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator comprising:
   a storage chamber;
   a first sidewall and a second sidewall including respectively:
   an inner side forming at least a portion of both side surfaces of the storage chamber,
   an outer side opposite the inner side, and
   a light source installation bracket extending from the outer side in a lateral direction;
   a light source arranged within an inner space formed by the light source installation bracket to illuminate an inside of the storage chamber; and
   a light guide member provided inside the storage chamber and formed to extend between the first sidewall and the second sidewall to guide light emitted from the light source,
   wherein the light guide member includes an incident surface arranged to face the first sidewall and an exit surface through which the light guided by the light guide member is emitted to an outside of the light guide member,
   wherein the first sidewall and the second sidewall are formed with a light source installation hole aligned with the incident surface, the light source is installed in the light source installation hole,
   wherein the refrigerator further comprises a lighting cover provided on the light source installation hole to cover the light source and including a material that transmits light of the light source, and
   wherein the lighting cover is in direct contact with a printed circuit board of the light source.

2. The refrigerator of claim 1, wherein the exit surface includes a light guide pattern.

3. The refrigerator of claim 2, wherein the light guide pattern includes one shape of a circle, an ellipse, a quadrangle, a polygon, a diamond or an embossing.

4. The refrigerator of claim 2, wherein the light guide pattern includes different densities between a first region that is a center of the light guide member and a second region except for the first region.

5. The refrigerator of claim 2, wherein a density of the light guide pattern decreases from a center of the light guide member toward an end portion of the light guide member.

6. The refrigerator of claim 1, further comprising a reflective member provided to reflect the light guided by the light guide member.

7. The refrigerator of claim 1, wherein:
the light source includes a plurality of light emitting diodes (LEDs) arranged in a front and rear side direction of the storage chamber,
the light guide member further includes a shelf frame forming an edge, and
the shelf frame is formed in at least a portion thereof with openings to correspond to the plurality of LEDs.

8. The refrigerator of claim 7, wherein the shelf frame further includes a guide rib that guides the openings to be adjacent to the light source.

9. The refrigerator of claim 1, further comprising:
a drawer provided to be inserted into or withdrawn from the storage chamber; and
a drawer case provided to accommodate the drawer,
wherein the light guide member is arranged on a front surface of the drawer case.

10. The refrigerator of claim 1, further comprising:
a drawer provided to be inserted into or withdrawn from the storage chamber, and including a front panel,
wherein the light guide member is provided on the front panel.

11. The refrigerator of claim 1, wherein the light guide member includes one of a panel, a bar or a band.

12. A refrigerator comprising:
a storage chamber;
a first sidewall and a second sidewall including respectively:
an inner side forming at least a portion of both side surfaces of the storage chamber,
an outer side opposite the inner side, and
a light source installation bracket extending from the outer side in a lateral direction;
a first light source arranged on the first sidewall to illuminate an inside of the storage chamber;
a second light source arranged on the second sidewall to illuminate an inside of the storage chamber; and
a light guide member formed to extend between the first sidewall and the second sidewall to guide light emitted from the first light source and the second light source,
wherein the light guide member includes a first incident surface arranged to face the first sidewall, a second incident surface arranged to face the second sidewall, and an exit surface through which the light guided by the light guide member is emitted to an outside of the light guide member,
wherein the first sidewall and the second sidewall are formed with a light source installation hole aligned with the first incident surface, a light source is installed in the light source installation hole,
wherein the first and the second light sources are arranged within an inner space formed by the light source installation bracket, respectively,
wherein the refrigerator further comprises a lighting cover provided on the light source installation hole to cover the light source and including a material that transmits light of the light source, and
wherein the lighting cover is in direct contact with a printed circuit board of the light source.

13. The refrigerator of claim 12, further comprising a reflective member provided to reflect the light guided by the light guide member.

14. The refrigerator of claim 12, comprising a light guide pattern formed on the exit surface, and the light guide pattern includes one of a circle, an ellipse, a quadrangle, a polygon, a diamond, and an embossing.

15. The refrigerator of claim 14, wherein the light guide pattern includes a density that decreases from a center of the light guide member toward both end portions of the light guide member.

16. The refrigerator of claim 12, further comprising:
a drawer provided to be inserted into or withdrawn from the storage chamber; and
a drawer case provided to accommodate the drawer,
wherein the light guide member is arranged on a front surface of the drawer case.

17. A refrigerator comprising:
a storage chamber;
a first sidewall and a second sidewall including respectively:
an inner side forming at least a portion of both side surfaces of the storage chamber,
an outer side opposite the inner side, and
a light source installation bracket extending from the outer side in a lateral direction;
a light source arranged within an inner space formed by the light source installation bracket to illuminate an inside of the storage chamber; and
a shelf including a light guide member provided inside the storage chamber and formed to extend between the first sidewall and the second sidewall to guide light emitted from the light source,
wherein the shelf includes:
an incident surface arranged to face the first sidewall; and
an exit surface including a light guide pattern formed to allow the light guided by the light guide member through the incident surface to be emitted to an outside of the light guide member,
wherein the first sidewall and the second sidewall are formed with a light source installation hole aligned with the incident surface, the light source is installed in the light source installation hole,
wherein the refrigerator further comprises a lighting cover provided on the light source installation hole to cover the light source and including a material that transmits light of the light source, and
wherein the lighting cover is in direct contact with a printed circuit board of the light source.

18. The refrigerator of claim 17, wherein the light guide pattern includes one shape of a circle, an ellipse, a quadrangle, a polygon, a diamond or an embossing.

* * * * *